(12) United States Patent
Todd

(10) Patent No.: US 7,665,013 B2
(45) Date of Patent: *Feb. 16, 2010

(54) ERROR CORRECTION MECHANISMS IN SPREADSHEET PACKAGES

(75) Inventor: Stephen James Todd, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 782 days.

This patent is subject to a terminal disclaimer.

(21) Appl. No.: 11/317,345

(22) Filed: Dec. 23, 2005

(65) Prior Publication Data

US 2006/0101326 A1    May 11, 2006

Related U.S. Application Data

(63) Continuation of application No. 09/894,746, filed on Jun. 28, 2001, now Pat. No. 6,986,099.

(30) Foreign Application Priority Data

Jul. 7, 2000    (GB)    .................. 0016687.6

(51) Int. Cl.
*G06F 17/00*    (2006.01)

(52) U.S. Cl. .................. 715/219; 715/220; 715/212; 715/217

(58) Field of Classification Search .................. 715/212, 715/219, 220, 217
See application file for complete search history.

(56) References Cited

U.S. PATENT DOCUMENTS

| | | | | |
|---|---|---|---|---|
| 5,708,827 | A | 1/1998 | Kaneko et al. | 395/764 |
| 5,778,240 | A | 7/1998 | Buchman et al. | 395/792 |
| 5,842,180 | A | 11/1998 | Khanna et al. | 705/30 |
| 6,292,811 | B1 | 9/2001 | Clancey et al. | 707/503 |
| 6,317,758 | B1 * | 11/2001 | Madsen et al. | 715/220 |
| 6,567,826 | B1 | 5/2003 | Fischer et al. | 707/202 |

* cited by examiner

*Primary Examiner*—William L Bashore
*Assistant Examiner*—Matthew J Ludwig
(74) *Attorney, Agent, or Firm*—John E. Campbell, Esq.; Kevin P. Radigan, Esq.; Heslin Rothenberg Farley & Mesiti, P.C.

(57) ABSTRACT

A spreadsheet package allows a base formula to be copied to at least one adjacent cell to form a referencing array. The package maintains a list of bound arrays, at least one cell of a bound array being referred to from a referencing array formula. If a formula within a referencing array cell includes a reference to a cell outside a bound array, the package indicates an error in the formula.

18 Claims, 14 Drawing Sheets

| | A | B | C | D | E | F | G | H |
|---|---|---|---|---|---|---|---|---|
| 1 | | | | | | | | |
| 2 | | gg | | | | | | |
| 3 | | 1 | 2 | | 2 | 4 | ERR | |
| 4 | | 3 | 4 | | 6 | 8 | ERR | |
| 5 | | | 5 | | ERR | ERR | ERR | |
| 6 | | | | | | | | |

| | A | B | C | D | E | F | G | H |
|---|---|---|---|---|---|---|---|---|
| 1 | | | | | | | | |
| 2 | | | | | | | | |
| 3 | | 1 | 2 | | 2 | 4 | 0 | |
| 4 | | 3 | 4 | | 6 | 8 | 0 | |
| 5 | | | 5 | | 0 | 10 | 0 | |
| 6 | | | | | | | | |

Figure 1 - Prior Art

| | A | B | C | D | E | F | G | H |
|---|---|---|---|---|---|---|---|---|
| 1 | | | | | | | | |
| 2 | | | | | | | | |
| 3 | | 1 | 2 | | B3*2 | C3*2 | D3*2 | |
| 4 | | 3 | 4 | | B4*2 | C4*2 | D4*2 | |
| 5 | | | 5 | | B5*2 | C5*2 | D5*2 | |
| 6 | | | | | | | | |

|   | A | B | C | D | E | F |
|---|---|---|---|---|---|---|
| 1 | Month | Amount Sold | Commission |   | Month | Rate |
| 2 | Jan | 10 | 100 |   | Jan | 10 |
| 3 | Feb | 20 | 240 |   | Feb | 12 |
| 4 | Mar | 30 | 330 |   | Mar | 11 |
| 5 | Apr | 25 | 0 |   |   |   |
| 6 |   |   |   |   | Vat: | 17.5% |

Figure 3 - Prior Art

|   | A | B | C | D | E | F |
|---|---|---|---|---|---|---|
| 1 | Month | Amount Sold | Commission |  | Month | Rate |
| 2 | Jan | 10 | 100 |  | Jan | 10 |
| 3 | Feb | 20 | 240 |  | Feb | 12 |
| 4 | Mar | 30 | 330 |  | Mar | 11 |
| 5 | Apr | 25 | 0 |  |  |  |
| 6 | May | 15 | 2.625 |  | Vat: | 17.5% |

Figure 4

|   | A | B | C | D | E | F |
|---|---|---|---|---|---|---|
| 1 | Month | Amount Sold | Commission |   | Month | Rate |
| 2 | Jan | 10 | 100 |   | Jan | 10 |
| 3 | Feb | 20 | 240 |   | Feb | 12 |
| 4 | Mar | 30 | 330 |   | Mar | 11 |
| 5 |   |   |   |   |   |   |
| 6 |   |   |   |   | Vat: | 17.5% |

Figure 5

|   | A | B | C | D | E | F | G | H |
|---|---|---|---|---|---|---|---|---|
| 1 |   |   |   |   |   |   |   |   |
| 2 |   | gg |   |   |   |   |   |   |
| 3 |   | 1 | 2 |   | 2 | 4 | ERR |   |
| 4 |   | 3 | 4 |   | 6 | 8 | ERR |   |
| 5 |   |   | 5 |   | ERR | ERR | ERR |   |
| 6 |   |   |   |   |   |   |   |   |

Figure 5a

|   | A | B | C | D | E | F | G | H |
|---|---|---|---|---|---|---|---|---|
| 1 |   |   |   |   |   |   |   |   |
| 2 |   | gg |   |   |   |   |   |   |
| 3 |   | 1 | 2 |   | gg(1,1)*2 | gg(1,2)*2 | gg(1,3)*2 |   |
| 4 |   | 3 | 4 |   | gg(2,1)*2 | gg(2,2)*2 | gg(2,3)*2 |   |
| 5 |   |   | 5 |   | gg(3,1)*2 | gg(3,2)*2 | gg(3,3)*2 |   |
| 6 |   |   |   |   |   |   |   |   |

Figure 9

|   | A | B | C | D | E | F |
|---|---|---|---|---|---|---|
| 1 | Month | Amount Sold | Commission |  | Month | Rate |
| 2 | Jan | 10 | 100 |  | Jan | 10 |
| 3 | Feb | 20 | 240 |  | Feb | 12 |
| 4 | Mar | 30 | 330 |  | Mar | 11 |
| 5 | Apr | 25 |  |  |  |  |
| 6 |  |  |  |  | Vat: | 17.5% |

Figure 10

|   | A | B | C | D | E | F |
|---|---|---|---|---|---|---|
| 1 | Month | Amount Sold | Commission | | Month | Rate |
| 2 | Jan | 10 | 100 | | Jan | 10 |
| 3 | Feb | 20 | 240 | | Feb | 12 |
| 4 | Mar | 30 | 330 | | Mar | 11 |
| 5 | Apr | 25 | | | UNSET | UNSET |
| 6 | | | | | Vat: | 17.5% |

Figure 11

| | A | B | C | D | E | F |
|---|---|---|---|---|---|---|
| 1 | Month | Amount Sold | Commission | | Month | Rate |
| 2 | Jan | 10 | 100 | | Jan | 10 |
| 3 | Feb | 20 | 240 | | Feb | 12 |
| 4 | Mar | 30 | 330 | | Mar | 11 |
| 5 | Apr | 25 | ERR | | UNSET | UNSET |
| 6 | May | 15 | ERR | | UNSET | UNSET |
| 7 | | | | | Vat: | 17.5% |

Figure 12

|   | A | B | C | D | E | F | G | H | I | J | K |
|---|---|---|---|---|---|---|---|---|---|---|---|
| 1 |   |   |   |   |   |   |   |   |   |   |   |
| 2 |   | gg |   |   |   |   |   |   |   |   |   |
| 3 |   | 1 | 2 |   | 2 | 4 |   |   |   |   | 0 |
| 4 |   | 3 | 4 |   | 6 | 8 |   |   |   |   | 0 |
| 5 |   |   | 5 |   |   |   |   |   | 0 | 10 | 0 |
| 6 |   |   |   |   |   |   |   |   |   |   |   |

Figure 13

| | A | B | C | D | E | F | G | H | I | J | K |
|---|---|---|---|---|---|---|---|---|---|---|---|
| 1 | | | | | | | | | | | |
| 2 | | gg | | | | | | | | | |
| 3 | | 1 | 2 | | 2 | 4 | | | 2 | 4 | 0 |
| 4 | | 3 | 4 | | 6 | 8 | | | 6 | 8 | 0 |
| 5 | | | | | | | | | 0 | 10 | 0 |
| 6 | | | | | | | | | | | |

ERROR CORRECTION MECHANISMS IN SPREADSHEET PACKAGES

PRIOR FOREIGN AND U.S. APPLICATIONS

This application is a continuation of co-pending U.S. patent application Ser. No. 09/894,746, filed Jun. 28, 2001, and entitled, "Error Correction Mechanisms in Spreadsheet Packages", which claims priority from United Kingdom Patent Application No. 0016687.6, filed Jul. 7, 2000, both of which are hereby incorporated herein by reference in their entirety.

TECHNICAL FIELD

The present invention relates to spreadsheet packages, and more particularly to error correction mechanisms within spreadsheets.

BACKGROUND OF THE INVENTION

Spreadsheet programs are widely used general programs that run on personal computers and have become well known tools for manipulating information electronically. They are commonly used for budgets, forecasting, and other finance-related tasks.

A conventional electronic spreadsheet organises data in a two-dimensional array of rows and columns. Each intersection of a row and a column is termed a cell. The cell can store numbers and data strings, as well as formulas for computing a result based upon values contained in other cells. To ease computation, spreadsheet programs include built-in functions that perform standard calculations. A formula may be constructed within a cell of the spreadsheet using one or more of the built-in functions combined with any other constants or variables.

Some spreadsheet programs can also link one spreadsheet to another containing related information to the first. This operation allows data in linked spreadsheets to be updated automatically. Additionally, spreadsheet programs also include macro facilities. Macros automatically repeat tasks that are to be performed frequently. Furthermore, spreadsheets provide a very convenient and visual mechanism for programming array calculations, for example, formula wizards.

FIG. 1 is used to illustrate the method by which formulae in cells are computed in existing spreadsheets. The examples used to describe standard spreadsheets herein are based on Lotus 1-2-3. (Lotus 1-2-3 is a registered trademark of Lotus Development Corporation.) The results of computation are shown in cells E3 . . . G5 and the corresponding formulae are shown in FIG. 1a.

On computation, the value 0 is held by cells E5 and G3 . . . G5, since the cells which are referenced, are empty. Existing spreadsheets assume the value of an empty cell is 0 and thus do not distinguish in normal calculations between a cell having null contents and one having contents set to 0. This problem is illustrated in FIG. 2, and a known method of detecting this problem in Lotus 1-2-3, for example, is to use an explicit @IsEmpty (location) check. This check tests the location for a blank cell and returns a 1 if the cell is empty and 0 if the cell is not.

To illustrate the need for improved error prompting, reporting and correction mechanisms, examples of the problems associated with existing spreadsheet technology are further described. The copy operation is used as an example. Referring to FIG. 2a simplified known spreadsheet implementing a commission calculation for a single salesman is shown. With conventional cell naming, the formula in cell C2 is =B2*F2, in cell C3 is =B3*F3, and so on. Generally the calculation involves the formula Commission=Amount Sold*Rate.

In reality, the column of the table representing the "rate", which would be common to all salespeople would be somewhat remote from the calculation. The calculation would be done for each salesperson. For example (not illustrated) the column containing "rate" values may be held on a different spreadsheet page.

When the spreadsheet of FIG. 2 is updated to include the values for a further month, "April" it is easy and quite common for an end user to copy down the calculation, but forgetting to extend the "rate" column. The copy down operation from C4=B4*F4 rewrites the formula for cell C5 as =B5*F5. However, since cell F5 is an empty cell, the value 0 is placed in C5.

As illustrated in FIG. 3, the errors obtained from an inaccurate copy operation can be more serious if the "commission" column is located on the same sheet together with constant values, for example the "VAT" value. When the spreadsheet is being updated for the month of "May", to calculate the value for cell C6, the formula used is =B6*F6. However, since the constant value for the "VAT", namely 17.5%, resides in cell F6, it is this 0.175 value that is used in the equation =B6*F6.

The error obtained in FIG. 3 is more confusing to the end user as compared to FIG. 2. Cell C5 in FIG. 2 is easily distinguishable from the existing values in the column. However, in FIG. 3, the value obtained in cell C6 is not so easily differentiated and the problem becomes clear if the constant was set at a value of 17.5 instead of 17.5%, for example. In this case, the result in cell C6 would be 262.5 and because this is a similar value to the existing values in the column, the user may not be aware that an error has occurred. Also, this is not a problem that can be detected using the @IsEmpty function. Therefore, in existing spreadsheets the computation and display of a result still occurs even if the end user does not have knowledge of any associated errors with the result.

Thus, whereas detecting common syntax errors including placing multiple operators together and mismatching parentheses is conventional, the present invention seeks to highlight semantic errors and it is these errors that most often occur when a correct spreadsheet is updated without full awareness or thought to its structure. Currently, very little protection is provided against traditional "array bound" errors as described above, and programmers are therefore prone to write incorrect programs referencing meaningless empty cells, or worse, referencing cells with inappropriate meaning.

There are systems, such as CleanSheet that combine some of the benefits of spreadsheets with tighter programming controls. However, these systems rely too much on programming to be acceptable by typical spreadsheet programmers. Also, error detection and correction methods for formulae in a spreadsheet have been described in U.S. Pat. No. 5,842,180, issued to Karan Khanna et al. However, these systems provide no support for array bound errors and semantic errors.

SUMMARY OF THE INVENTION

According to the present invention there is provided a spreadsheet package for processing spreadsheets comprising means for enabling copying of a base formula to at least one adjacent cell of said spreadsheet to form a referencing array; means for maintaining a list of bound arrays, at least one cell of a bound array being referred to from a referencing array formula; and means, responsive to a formula within a referencing array cell including a reference to a cell outside a bound array, for indicating an error in said formula.

In other aspects, the invention provides a computer program product and a method for processing a spreadsheet.

The invention interferes little with existing spreadsheet conventions. It adds the minimum of new concepts which are worrying to existing users, whilst also achieving the greater constraint required to minimise errors within spreadsheets. The use of features of existing spreadsheets such as "ERR" functions is advantageous in that it ties into what existing end users expect from standard spreadsheets. Furthermore, using the invention, potential array bounds errors are captured at source, reducing risk of spreadsheet programming errors.

By using bound array style references of the preferred embodiment, the system need only check once which cells are referencing array cells and which referencing array cells refer into a bound array. Using standard style references of the alternative embodiment, the system has to check each time the spreadsheet is changed or updated, and this has a considerable overhead associated with it.

BRIEF DESCRIPTION OF THE DRAWINGS

The present invention will now be described, by way of example only, with reference to preferred embodiments thereof, as illustrated in the following drawings:

FIG. 1 shows a schematic overview of an existing spreadsheet containing the results of computation of formulae;

FIG. 1a shows a schematic overview of the formulae involved in FIG. 1;

FIG. 2 shows a schematic overview of a copy operation using a mouse in existing spreadsheets;

FIG. 3 shows a schematic overview of a further copy operation using a mouse in existing spreadsheets;

FIG. 4 shows a schematic overview of an example of a spreadsheet used to illustrate the present invention, with declarations of bound arrays and of referencing arrays;

FIG. 5 shows a schematic overview of the results of computation of formulae according to the present invention;

FIG. 5a shows a schematic overview of the formulae involved in FIG. 5;

FIG. 9 shows a schematic overview of an error correction mechanism for a copy operation using a mouse, according to the present invention;

FIG. 10 shows a schematic overview of an error correction mechanism for a bound array extension operation, according to the present invention;

FIG. 11 shows a schematic overview of another error correction mechanism for a bound array extension operation, according to the present invention;

FIG. 12 shows a schematic overview of the alternative options involved whilst creating a bound array, according to the present invention;

FIG. 13 shows a schematic overview of an alternative option to FIG. 12, namely, enlarging a bound array, according to the present invention.

BEST MODE FOR CARRYING OUT THE INVENTION

A. Bound arrays and Referencing Arrays

Figure 6:
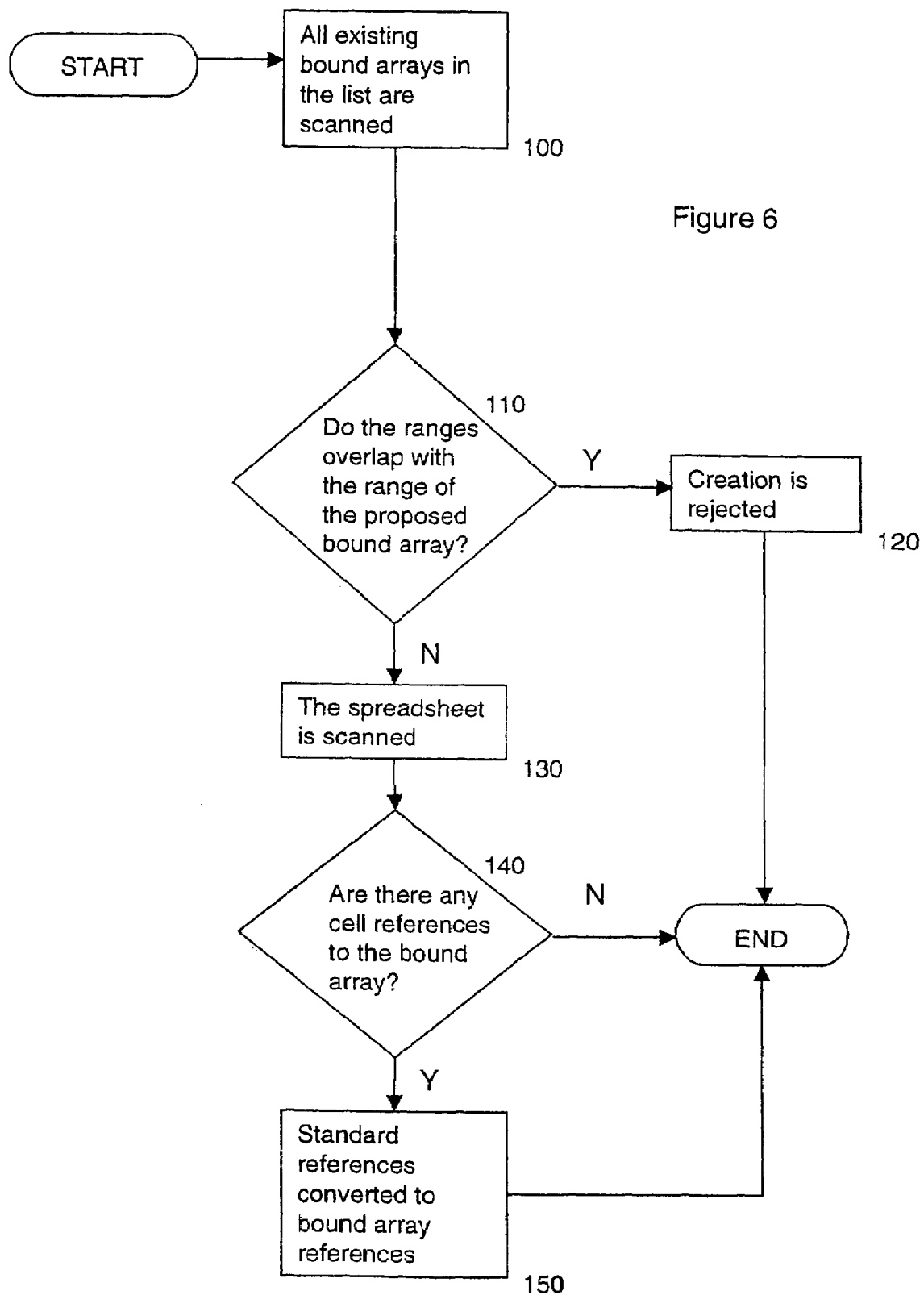
FIG. 6 is a flow chart of the operational steps involved creating a bound array, according to the present invention.

According to the present invention, there is provided the concept of a "bound array" corresponding to a particular range of a sheet. In the present specification, arrays including cells that reference at least one cell of a bound array and comprise copies of the same base formula are termed referencing arrays.

Specifically, a spreadsheet implementation of the present invention holds a list of bound arrays wherein each element of the list contains the name of the array, and the range of the sheet it occupies. For example, the list generally contains the information arrayname=BA_Name, range=XX:XX, whereby BA_Name is the name of the array and XX:XX are the range of cells comprising the bound array. (Although compatible and complementary, bound arrays should not be confused with conventional named ranges.)

Referring to FIG. 4, examples of bound arrays are the "Amount sold" column and corresponding "Months" column, namely, A2 . . . B4; and the "Rate" column and corresponding "Months" column, namely, E2 . . . F4. Preferably, the bound arrays would be highlighted in some way, allowing the end user to easily identify the arrays. The highlighting can be implemented by displaying a border around a bound array in bold, as shown in this example. Alternatively, the text within the bound array could be displayed in a larger font or in a different colour. However, an artisan of ordinary skill should understand that the highlighting mechanism could be implemented in any other way. Also in FIG. 4, the referencing array is highlighted by a dashed border and it contains the cells C2 . . . C4.

Preferably, references into a bound array are not held in the standard spreadsheet style namely, (COLUMN LETTER), for example "D" or (COLUMN LETTER) (ROW NUMBER), for example, "D5". Preferably, the references are held relative to the bound array. Therefore, if the name of the bound array is "gg" and the end user wishes to reference the cell in the first row and second column of the bound array, the bound array reference is gg(1,2). In spreadsheets a reference of the type D5, is known as a relative reference. Absolute references are made by typing a dollar sign immediately before the part of the address, which is to remain the same when the reference is moved or copied elsewhere, for example, $A$2*$B$4. Mixed references contain a combination of relative and absolute references, for example, $A$2*B4. Relative, absolute and mixed references are made into a bound array in a manner analogous with a standard spreadsheet, so that an absolute reference might be of the form gg($1,$2) or a mixed reference might be of the type gg(1,$2).

Alternatively, references from a referencing array into a bound array held in the standard spreadsheet style will result in the system needing to check dynamically the new locations of moved or copied cells to verify that the required rules are maintained. If the reference from a referencing array cell does not point into a bound array, an "ERR" will be returned for the reference causing the formulae as a whole to result in an "ERR". Therefore the rule implemented is that every cell is EITHER in a referencing array, OR available in a standard manner on the sheet, but NOT both. In this case, the system has more processing to do in re-checking which references are contained within a bound array and which are not. Also, this means that the system must maintain or check that referencing cells are within referencing arrays.

In any case, FIG. 5 shows a schematic diagram of the results of computation of formulae held by referencing array cells. The formulae are shown in FIG. 5a. Shown is a single bound array named "gg", therefore, the list held in the spreadsheet would hold the information, arrayname=gg, range=B3:C4. Alternatively, in addition to the lists holding bound array information, "inverted" lists may be held giving immediate access to all the cells of the referencing array. This is a standard performance choice, since certain operations will become quicker, but others will become slower and the code will become more complex.

B. Creation of a Bound Array

When a new bound array is created, for example by the user selecting a range and then choosing to designate this as a bound array, the steps in FIG. 6 are followed. Firstly, all existing bound arrays in the list are scanned (100). The ranges of the known bound arrays are checked (110) against the range of the proposed bound array and if they overlap, the creation operation is rejected (120). If however, the ranges do not overlap, then the creation operation is permitted and the entire sheet is searched (130) for references into the new bound array. If standard cell references are found, such references are replaced (150) by the corresponding bound array style references.

C. Creation of a Referencing Array

Figure 7:
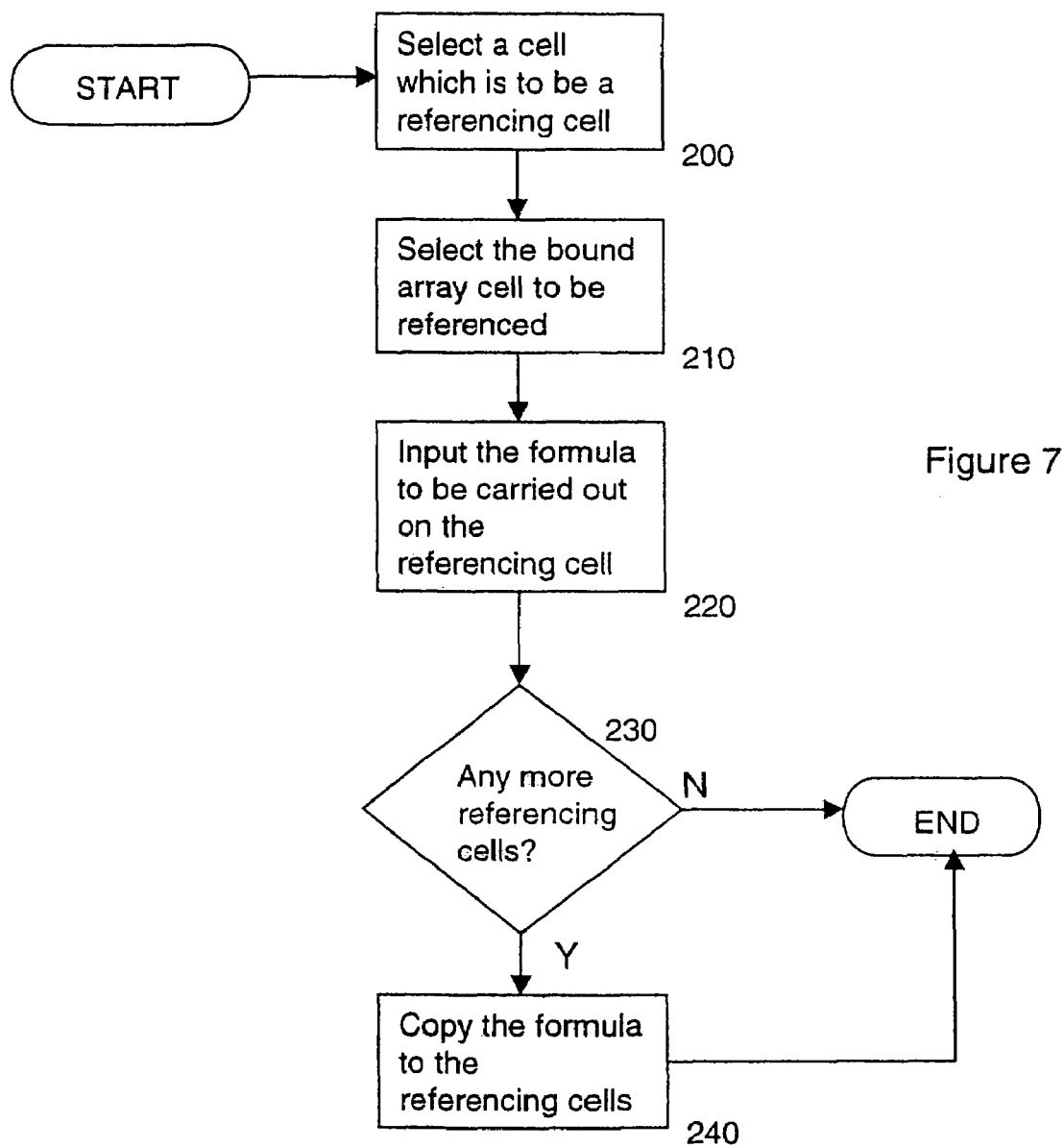
FIG. 7 is a flow chart of the operational steps involved creating a referencing array, according to the present invention.

The referencing array E3 ... G5 in FIG. 5, may have been created by the end user whilst implementing the following steps, as shown in the flow chart in FIG. 7. FIGS. 5 and 5a are used in conjunction with FIG. 7. For example, to define the entry at E3, the cell is selected (200) and when using Lotus 1-2-3, the end user must type the "=" built in function in order to initiate the construction of a formula. Next, the cell in the bound array to be referenced by E3, is selected (210). In this case a reference to the bound array cell B3 is made. B3 is equivalently gg(1,1) in the bound array style of reference.

Cell E3 is once again selected and the formula is inputted (220). In this example, "*2" is entered by the end user. Finally the end user presses the "Enter" key on the keyboard to complete the formula. If the end user decides (230) to copy the formula down to other cells the range is extended (240) down by manipulating the mouse to show the "extend" handle, to cover for example, the cells E3 ... G5.

It will therefore be seen that using the bound array style of reference, the user is able to selectively create references within referencing array formulae which refer into bound arrays or into non-bound array cells. So, in the example above, where the user entered "*2" or after entering "*2", the user could just as easily have entered a reference to, say the VAT cell F6 of FIG. 4 which is not within a bound array. The reference to this cell would be stored in a conventional manner distinct from the bound array style references into the array "gg". This means that the user has not decided to check for array bound errors to the cell F6 but only wishes to check for array bound errors relating to the bound array "gg". Thus, the spreadsheet only checks the explicit bound array references to determine if these properly fall within the bound array. (If the user subsequently wishes to have array bound error checking applied to cell F6, then this cell can be defined as a bound array, as described in relation to FIG. 6.)

In the alternative embodiment, where only standard type references are used, no such distinction can be made and the spreadsheet package therefore forces all references from reference array cells to be into bound arrays, otherwise an error will result.

D. Computation of Referencing Array Cells

Figure 8:
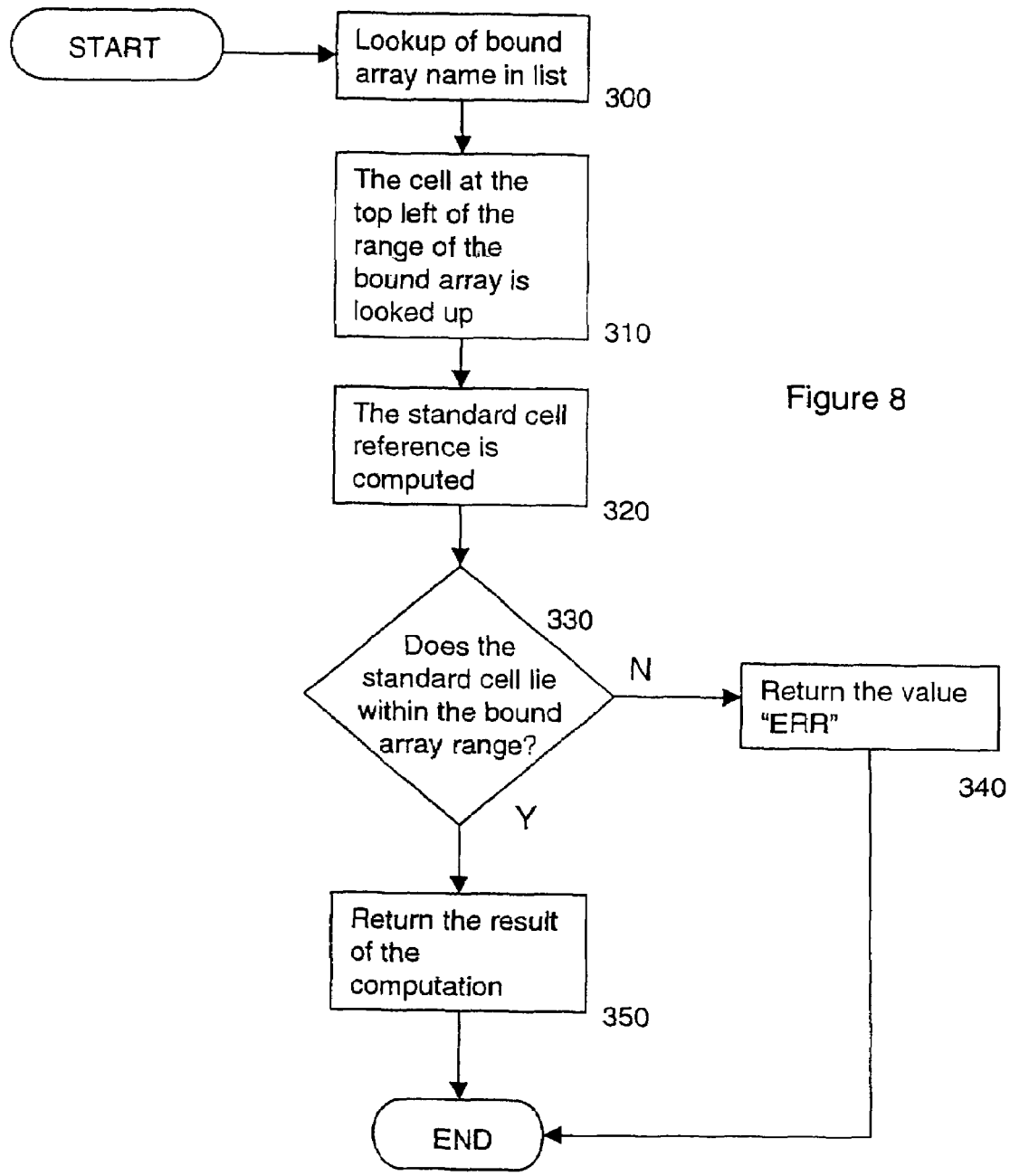
FIG. 8 is a flow chart of the operational steps involved in looking up bound array references when computing formulae held in referencing arrays, according to the present invention.

When the formulae in referencing arrays are computed, bound array references are looked up as shown in FIG. 8. Firstly, the name of the bound array is found (300) in the list held by the spreadsheet. Next, the "base" cell of the bound array, that is, the cell at the top left of the range is looked (310) up. Then, the standard cell reference is computed (320) in order to compare (330) the cell to the bound array range. Comparison (330) determines whether the standard cell reference lies within the range and if this is so, the appropriate result of the computation is returned (340). If the standard cell does not lie within the range, then the "ERR" function is returned (350). The "ERR" function is a standard function in Lotus 1-2-3, which flags errors in cells involved in calculations or with data input.

Examples of the process shown in FIG. 8 are now described. For example, to compute the value in cell F3 of FIG. 5, for gg(1,2)*2, the following steps are carried out:
1. The name "gg" is found (200) in the list of bound arrays
2. The "base" cell B3 of the bound array is found (210)
3. The normal cell reference C3 is computed (220)
4. Verification (230) as to whether the cell C3 is in the range B2 ... C4 occurs
5. Since C3 is in the range the value "2" is placed into gg(1,2). The result of the computation 2*2, equivalent to gg(1,2)*2, is returned (240), namely the value "4" is returned (240) for cell F3.

As another example, to compute the value in cell F5 of FIG. 5, for gg(3,2)*2, the following steps are carried out:
1. The name "gg" is found (200) in the list of bound arrays
2. The "base" cell B3 of the bound array is found (210)
3. The normal cell reference C5 is computed (220)
4. Verification (230) as to whether the cell C5 is in the range B2 ... C4 occurs
5. Since C5 is not in the range, the function "ERR" is placed (250) into gg(3,2). The result of the computation ERR*2, equivalent to gg(3,2)*2, is returned (250), namely the value "ERR" is returned for cell F5.

E. Copy Down Operation of a Referencing Array Using a Mouse

Having described the basic technique for calculating the value of referencing array cells in relation to FIG. 5, FIG. 9 now shows the copy down operation of prior art FIG. 2, using the present invention. The copy operation of a referencing array cell formula is forbidden or a warning message is displayed if a reference in the source of the copy points into a bound array and the rewritten reference in the copy points outside the bound array.

Thus, when the spreadsheet of FIG. 9 is updated to add the extra month of "April", the formula for the "commission" column in "March" is copied down from C4=B4*F4 (using the standard referencing embodiment) or its equivalent using bound array references, by stretching the column using the mouse. Consequently, the formula for C5 is re-written as =B5*F5 or again its equivalent using bound array references. Since the referenced cell F4 is within a declared bound array and rewritten reference F5 or its equivalent bound array reference is outside it, the copy operation is rejected. The cell C5 holds the value "ERR" to indicate that an invalid operation has occurred.

E.1. Copy Operation of a Referencing Array Using a Keyboard

Preferably, formulae involved in a copy operation using a keyboard follow the existing spreadsheet rules for "relative" positions. However, the syntactic implementation varies somewhat according to the present invention. For example, referring to FIG. 5a, in a standard spreadsheet, the copy of the formula, =B3*2 in cell E3 to cell F3 results in the formula =C3*2. However, using the implementation of bound arrays references, the copy of formula =gg(1,1)*2 from E3 to F3 results in the formula =gg(1,2)*2.

The copy operation is always permitted, even if the result is erroneous. For example, the result of a copy operation could be "ERR". Furthermore, a copied reference may even contain 0 or negative array indices in which case, the reference will always compute to an error result, even if the array is extended. However, the formula is not destroyed and may be re-copied to another valid position. For example, in FIGS. 5 and 5a, if the formula =gg(1,1)*2 is copied from E3 to C1, the resulting formula will be =gg(−1,−1)*2. This resulting formula will not generate a sensible result, however, if it is again copied from C1 to F4, the resulting formula will be =gg(2,2) *2. If this formula is computed, a valid result will be obtained, namely, 8. Although a copy operation is always permitted, a warning pop up message could be displayed to the end user at the time to caution of a potential invalid operation.

F. Extension of a Bound Array

FIGS. 9 & 10 show the extension of a bound array from E2 . . . F4, to E2 . . . F5. The extension of a bound array could occur automatically, assuming there is sufficient space. Preferably, the cells contained by the larger bound array hold explicit "UNSET" values, which do not participate in calculations. This is advantageous as the values serve as an error reporting mechanism to the end user. (Cell C5 holds the "ERR" function, which is different to the "UNSET" value since C5 participates in calculations.)

In existing spreadsheets, the copy down operation to add the month of "May" would usually either be rejected because cells E6 and F6 already hold information; or the information in cells E6 and F6 would be overwritten, neither of which may be desirable.

FIG. 11 shows an embodiment of the error correction mechanisms to allow further enlargement of the bound arrays, by implementing an operation to automatically cut and paste the VAT cells downward into cells E7 and F7. Coupled together with the conventional spreadsheet rewriting of any cells that reference the VAT cells, the "pushdown" of the VAT cells permits the extension of the bound array from E2 . . . F5 to E2 . . . F6, without affecting the calculations.

G. Error Prompting, Reporting and Correction

G.1 Bound Arrays

Error prompting may occur by highlighting the problem area, which may be that the bound array is insufficiently large. The focus of the end user may be directed to the bound array with pop up menus or perhaps by highlighting the bound array in bold. Another example is the use of "UNSET" values to indicate to the end user the presence of empty cells.

To increase the usability of the present invention, it is a preferred aspect that the end user is prompted prior to any error correction options. This ensures that error correction will not be automatically carried out by the system without some interaction by the end user.

G.2. Referencing Arrays

Error prompting also occurs within referencing arrays. In the example of FIG. 5, error prompting is shown with an "ERR" placed in the relevant referencing array cells to indicate to the user that an erroneous calculation has occurred. Further improvement could be implemented in the present invention, by returning (ERR, Value) for a bound array cell reference, whereby "Value" represents the correct value of the bound array cell. The end user would then be presented with an option to either accept or reject the insertion of this value; or the final value of the reference array cell formulae could be hightlighted in a manner showing that it is based on an invalid reference to a bound array.

H. Options when Referencing a Newly Created Bound Array

More specifically, the rules for referencing a newly created bound array can be left to the discretion of the developer. This embodiment assumes that two adjacent cells with equivalent formulae are offset by standard spreadsheet rules for relativity. Moreover, one cell references a border cell in the new array and the adjacent cell references outside the array. Using this example, a description for the cells as shown in FIG. 12 follows:

1. Cells marked in a dashed and dotted border contain formulae whereby every instance of each cell references into the bound array.
2. Cells marked with hashing contain formulae referencing into the bound array. However other adjacent cells containing equivalent formulae, reference outside the bound array.
3. Cells marked with a dashed border contain formulae referencing outside the bound array. However other adjacent cells containing equivalent formulae, reference inside the bound array.

Figure 12:
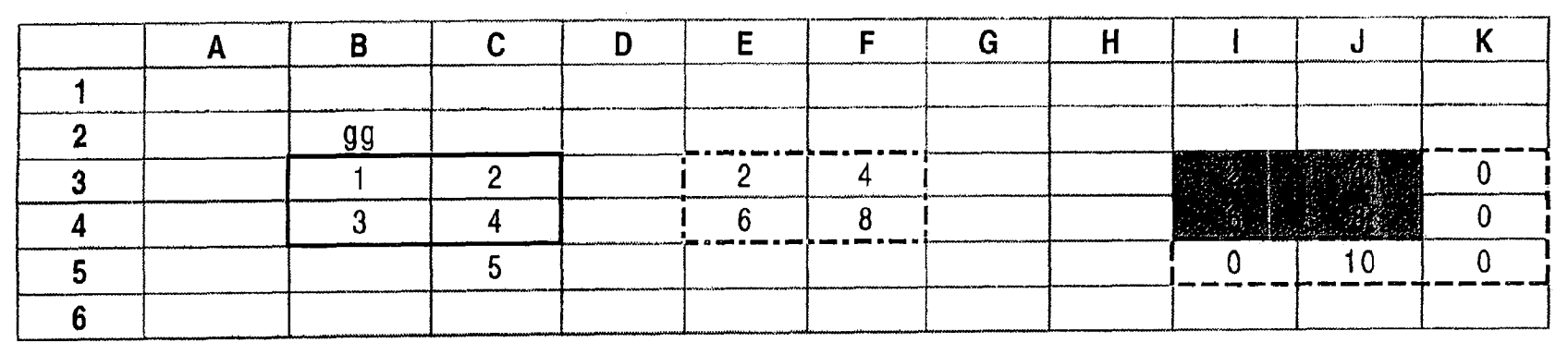

Referring to the examples shown in FIG. 12, an explanation of rules 1, 2 and 3 follows. The end user is creating the bound array named gg. The cell range E3 . . . F4 consistently refers into the proposed new bound array and is therefore marked with a dashed and dotted border. However, the cells I3 . . . K5 are inconsistent, since I3 . . . J4 refers into the proposed bound array, but the remainder does not. Therefore, I3 . . . J4 are marked with hashing and the remaining cells are marked with a dashed border.

The end user can be presented with one of six options regarding the creation of references into a bound array:

1) The option giving the end user most freedom is to create array references from all cells. This operation will render the dashed cell references invalid, perhaps temporarily, since these cells reference outside of the bound array. An indication may be provided to the end user that the cells have become invalid by using the "UNSET" for example.
2) This option provides the end user with less freedom than (a.), in that references are made from only the cells marked with a dashed and dotted border and from those marked with hashing. The cells marked with hashing and a dashed border were previously adjacent and held equivalent formulae. Since references from the dashed cells have been excluded they now contain non-equivalent formulae.

Figure 13:
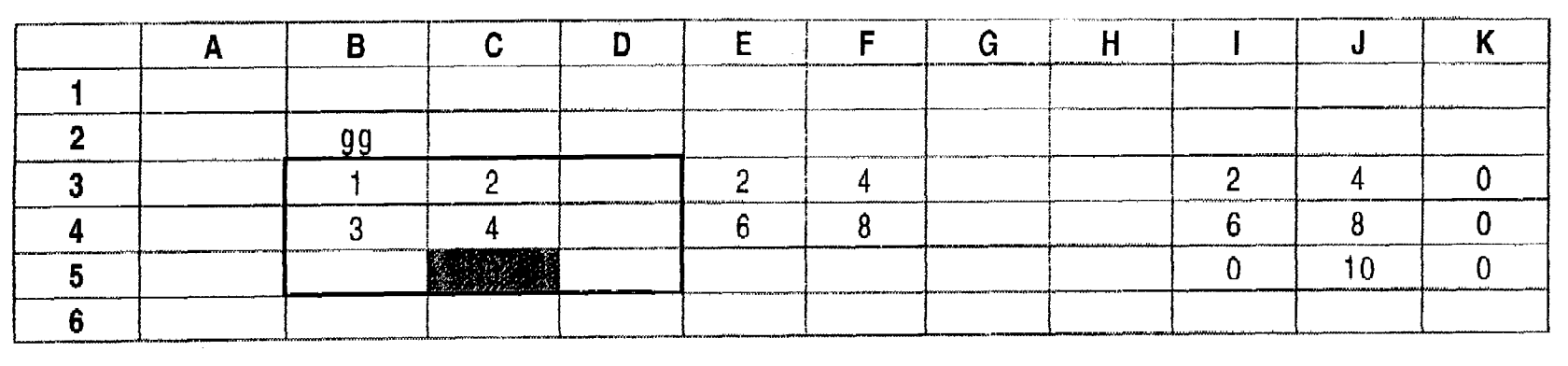

3) This option restricts the end user to creating array references from only the cells marked with a dashed and dotted border. Consequently, the cell references marked with hashing will become invalid, perhaps temporarily.
4) A more constrictive approach is to prevent the end user from creating any array references whatsoever. As a consequence the cells with valid references, namely those with a dashed and dotted border and hashing will become temporarily invalid.
5) Referring to FIG. 13, an alternative option to (a.) through (d.) above, is to permit the end user to enlarge the proposed new bound array, for example to cells B3 . . . D5 in order to create valid references, namely E3 . . . G5. The new bound array is shown with a bold border and the previously populated cells are shown with hashing. The error correction mechanisms of FIGS. 9 to 11 may be implemented to resolve the problem with the populated cell.
6) Another alternative option presented to the end user is the cancel the creation of references into the bound array altogether.

Alternatively, the options (1) through (6) above may be presented to the end user in a keyword list or by any other means. Finally, when the end user wishes to destroy a bound array, the worksheet is again searched and any reference into the bound array is turned into the equivalent standard style reference. For example, the reference gg(1,1) is converted to reference E3.

I. Move and Cut Operations

Other operations that can be implemented with bound arrays are move and cut operations. The move operation transfers information to another location whereby the original source of information is either deleted immediately or can be deleted at a later time. The cut operation removes information temporarily so that it can be pasted into another location at a later time. The original source of information is deleted immediately.

It may be the case that a bound array has been declared a certain size, however, some areas of the array may not actually be referenced. In this case, a move or a cut operation of a bound array resulting in the non-referenced area to exist in its original location is permitted. The result of this operation is that the original source bound array ceases to exist and the non-referenced cells that previously formed part of it are no longer part of any bound array. The target bound array, which has been moved (in the case of a move operation) or pasted (in the case of a cut operation) is smaller in size compared to the original bound array.

J. Insert and Delete Operations

In the case where an underlying spreadsheet row or column is to be inserted or deleted, any bound arrays that intersect with the row or column may be left untouched. The bound arrays are treated as a separate "layer" above the sheet and are therefore not affected by insertions and deletions to the sheet. This is similar to graphics programs. Conversely, rows or columns may also be added or deleted from a bound array. Again the structure of the host worksheet is not disturbed. In each case, referencing formulae are updated as is known with current spreadsheet technology.

Insertion and deletion within a bound array is prevented however, if expansion of the bound array causes it to impinge on occupied cells of the host worksheet. However, preferably, the host worksheet may be reorganised to accommodate expansion using the "pushdown" mechanism as illustrated in FIG. 11. The insertion and deletion rules can be determined in a straightforward manner from the required behaviour and the underlying implementation data structures.

K. Alternative Embodiments of the Present Invention

The embodiments above were described in relation to two-dimensional arrays on a single sheet. The rules and examples can be easily modified for one-dimensional arrays, or for arrays of more than two dimensions or for arrays on different sheets or workbooks. These modifications require extra information to be held in the list of bound and/or referencing arrays.

Furthermore, it would be natural and convenient to use named ranges for bound arrays—as this would also enable a user to refer to bound arrays by name. Firstly, the range which would encompass the bound array is specified and this range is then named. The implementation preferably keeps arrays and named ranges as separate but associated concepts, ensuring that association between the two can be made easily. Additionally, the arrays and named ranges are synchronised once the association has been made.

Figure 14:
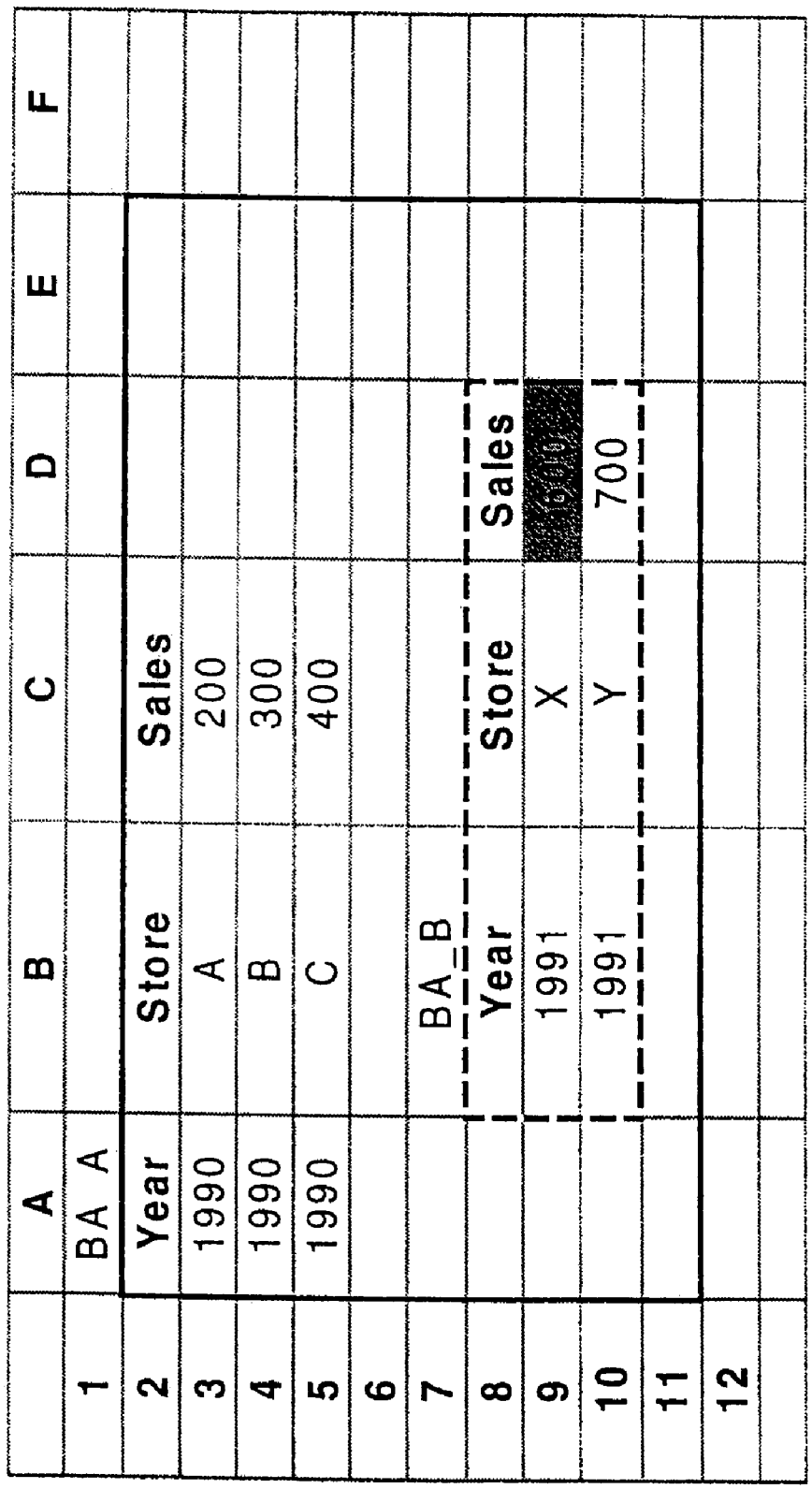
FIG. 14 shows a schematic overview of an alternative embodiment of the present invention, namely hierarchically nesting bound arrays.

In an alternative embodiment of the present invention, bound arrays can be hierarchically nested if convenient. Where nesting is used this behaves like a multiple layer system. As shown in FIG. 14, BA_A, the bound array at the top of the hierarchy is shown in a bold border and BA_B, the bound array in a dashed border is nested at the layer below. If a reference is to be made to the cell in the "Sale" column for the year 1991, shown in hashing, then the reference would be to BA_A (4,8), not to BA_B (3,2). Therefore, references into a hierarchically nested bound array are always made in relation to the bound array at the top level in the hierarchy.

In an alternative embodiment of the present invention, it is possible to automatically generate bound arrays. Firstly, the spreadsheet is searched for cells having the same base formula, to detect referencing arrays. Next, the sheet is searched for any arrays which are referenced by the referencing arrays. These arrays are then defined as bound arrays. This technique is useful for taking spreadsheets not currently implementing the bound arrays and converting them for use with the present invention.

Furthermore, while the examples described herein are based on Lotus 1-2-3, it should be understood that the present invention may be applied to any other spreadsheet program.

It should also be seen that while the cells of bound arrays in the preferred embodiment are shown as absolute values, these may in fact also comprise formulae. Where formulae in a bound array are related then the cells of the bound array could also comprise a referencing array, subject to the same rules as other referencing arrays.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A spreadsheet package comprising computer program code stored on a computer readable medium for, when executed on a computing device, processing spreadsheets comprising:
    means for enabling copying of a base formula to at least one adjacent cell of said spreadsheet to form a referencing array;
    means for maintaining a list of bound arrays, at least one cell of a bound array being referred to from a referencing array formula, and each bound array corresponding to an associated range of the cells of the spreadsheet, and comprising a bound array name distinct from any column name or row name of the spreadsheet, wherein the at least one cell of the bound array is referred to from the referencing array formula using the bound array name of the bound array;
    means for identifying a formula within a referencing array cell comprising a reference to a cell outside a bound array; and
    means, responsive to said identifying of a formula within a referencing array cell including a reference to a cell outside a bound array, for automatically indicating an array bound error in said formula, said array bound error comprising the reference to the cell outside the bound array.

2. A spreadsheet package as claimed in claim 1, in which references from referencing array cell formulae into a bound array are defined relative to a bound array range and said indicating means is responsive to a relative bound array reference comprising a reference to a cell outside a bound array, for indicating an error in said formula.

3. A spreadsheet package as claimed in claim 1, in which references from referencing array cell formulae into a bound array are maintained in a standard spreadsheet manner and said indicating means is responsive to any referencing array cell formula comprising a reference to a cell outside a bound array, for indicating an error in said formula.

4. A spreadsheet package as claimed in claim 1, further comprising means responsive to an indication of an error in said reference, for invoking error prompting, reporting and correction mechanisms.

5. A spreadsheet package as claimed in claim 4, in which said error prompting mechanism comprises means for generating a pop up window.

6. A spreadsheet package as claimed in claim 5, in which said error reporting mechanism comprises means for displaying an error result for said referencing array cell formula.

7. A spreadsheet package as claimed in claim 4, comprising means, responsive to the identifying of a reference to a cell outside a bound array within a referencing array cell formula, for returning a value for said reference and an error indication.

8. A spreadsheet package as claimed in claim 7, in which said error reporting mechanism comprises means for displaying a result for said referencing array cell formula according to said returned value and an indication that said result is an error.

9. A computer-implemented method comprising computer program code stored on a computer readable storage medium for, when executed on a computer device, processing a spreadsheet comprising:
    copying of a base formula to at least one adjacent cell of said spreadsheet to form a referencing array;
    maintaining a list of bound arrays, at least one cell of a bound array being referred to from a referencing array formula, and each bound array corresponding to an associated range of the cells of the spreadsheet, and comprising a bound array name distinct from any column name or row name of the spreadsheet, wherein the at least one cell of the bound array is referred to from the referencing array formula using the bound array name of the bound array;
    identifying a formula within a referencing array cell comprising a reference to a cell outside a bound array; and
    responsive to said identifying of a formula within a referencing array cell including a reference to a cell outside a bound array, automatically indicating an array bound error in said formula, said array bound error comprising the reference to the cell outside the bound array.

10. The computer-implemented method of claim 9, in which references from referencing array cell formulae into a bound array are defined relative to a bound array range, and wherein said indicating is responsive to a relative bound array reference comprising a reference to a cell outside a bound array, for indicating an error in said formula.

11. The computer-implemented method of claim 9, in which references from referencing array cell formulae into a bound array are maintained in a standard spreadsheet manner, and wherein said indicating is responsive to any referencing array cell formula comprising a reference to a cell outside a bound array, for indicating an error in said formula.

12. The computer-implemented method of claim 9, further comprising, responsive to an indication of an error in said reference, invoking error prompting, reporting and correction mechanisms.

13. The computer-implemented method of claim 12, wherein said error prompting includes displaying an error result for said referencing array cell formula.

14. The computer-implemented method of claim 12, further comprising, responsive to the identifying of a reference to a cell outside a bound array within a referencing array cell formula, returning a value for said reference and an error indication.

15. The computer-implemented method of claim 10, further comprising, responsive to a user selection of a range for new bound array, checking the range of said new bound array against said list of bound arrays to determine if said new bound array is allowable, said checking comprising:
    adding the new bound array to said list of bound arrays if the range of the new bound array does not overlap with the list of bound arrays;
    searching the spreadsheet to identify any standard references into the new bound array;
    responsive to identifying such a reference, converting any identified references into references relative to the new bound array; and
    rejecting the addition of the new bound array to said list of bound arrays if the range of the new bound array overlaps with the list of bound arrays.

16. The computer-implemented method of claim 9, further comprising detecting referencing arrays, each referencing array comprising a plurality of adjacent cells including respective copies of the same base formula that reference at least one cell of a bound array, and displaying cells of referencing arrays correctly referencing a bound array differently from cells of referencing arrays including any incorrect references to bound arrays.

17. The computer-implemented method of claim 16, further comprising, responsive to a copy operation of a referencing array through user interaction, determining first references in the formulae of said referencing array referring into a bound array and second references in the formulae of the copied referencing array referring outside the bound array, and wherein said displaying comprises highlighting formulae including only first references differently from formulae including second references.

18. At least one program storage device readable by at least one computer, tangibly embodying at least one program of instructions executable by the at least one computer to perform a method for processing a spreadsheet, the method comprising:

copying of a base formula to at least one adjacent cell of said spreadsheet to form a referencing array;

maintaining a list of bound arrays, at least one cell of a bound array being referred to from a referencing array formula, and each bound array corresponding to an associated range of the cells of the spreadsheet, and comprising a bound array name distinct from any column name or row name of the spreadsheet, wherein the at least one cell of the bound array is referred to from the referencing array formula using the bound array name of the bound array;

identifying a formula within a referencing array cell comprising a reference to a cell outside a bound array; and responsive to said identifying of a formula within a referencing array cell including a reference to a cell outside a bound array, automatically indicating an array bound error in said formula, said array bound error comprising the reference to the cell outside the bound array.

* * * * *

UNITED STATES PATENT AND TRADEMARK OFFICE
CERTIFICATE OF CORRECTION

| | |
|---|---|
| PATENT NO. | : 7,665,013 B2 |
| APPLICATION NO. | : 11/317345 |
| DATED | : February 16, 2010 |
| INVENTOR(S) | : Stephen James Todd |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Seventh Day of December, 2010

David J. Kappos
*Director of the United States Patent and Trademark Office*